United States Patent [19]
Bryson et al.

[11] Patent Number: 5,332,701
[45] Date of Patent: Jul. 26, 1994

[54] CERAMIC SYNTHESIS BY PYROLYSIS OF METAL-CONTAINING POLYMER AND METAL

[75] Inventors: Nathan Bryson, Haguenau, France; Dietmar Seyferth, Lexington, Mass.; Henry J. Tracy, Portsmouth, N.H.; David P. Workman, Somerville, Mass.

[73] Assignee: Massachusetts Institute of Technology, Cambridge, Mass.

[21] Appl. No.: 628,532

[22] Filed: Dec. 14, 1990

[51] Int. Cl.$^5$ .................. C04B 35/56; C04B 35/58
[52] U.S. Cl. ............................ 501/87; 501/91; 501/92; 501/96
[58] Field of Search .............. 501/87, 91, 92, 96; 106/287.1, 287.17, 287.18, 287.19

[56] References Cited

U.S. PATENT DOCUMENTS

| | | | |
|---|---|---|---|
| 4,543,344 | 9/1985 | Cannady | 501/92 |
| 4,666,872 | 5/1987 | Baney et al. | 501/92 |
| 4,668,642 | 5/1987 | Bujalski | 501/92 |
| 4,757,035 | 7/1988 | Baney et al. | 501/92 |
| 4,767,728 | 8/1988 | Riccitiello et al. | 501/91 |
| 4,851,491 | 7/1989 | Riccitiello et al. | 501/96 |
| 5,041,337 | 8/1991 | Niebylski | 428/446 |

FOREIGN PATENT DOCUMENTS

| | | |
|---|---|---|
| 53052521 | 10/1976 | Japan . |
| 57077083 | 10/1980 | Japan . |

Primary Examiner—Mark L. Bell
Assistant Examiner—Deborah Jones
Attorney, Agent, or Firm—Richard P. Fennelly; Louis A. Morris

[57] ABSTRACT

Ceramic compositions can be formed by the pyrolysis of a particulate metal, which forms a component of the ceramic, and another metal, which forms another component of the ceramic.

18 Claims, No Drawings

CERAMIC SYNTHESIS BY PYROLYSIS OF METAL-CONTAINING POLYMER AND METAL

The Government has rights in this invention pursuant to Contract Number AFSOR 89-0040B awarded by the Department of the Air Force.

BACKGROUND OF THE INVENTION

Various techniques have been used to form ceramic materials of interest to persons of ordinary skill in the art.

It is known, for example, to utilize solid state reactions of metals with ceramics to form new ceramic phases incorporating the metal. References which utilize such an approach include: Desu et al., J. Am. Ceram. Soc., 73 (1990) 509; Gatman et al., J. Mater. Sci. Lettr. 9 (1990) 813; Morozumi et al., J. Japan Inst. Metals, 45 (1981), 184; and Choi et al., J. Mater. Sci. 25 (1990) 1957.

The pyrolysis of polymer precursors for ceramic materials is another general approach to form ceramics (e.g., the carbides, nitrides and borides). Representative references which discuss this approach for certain ceramics include: Wynne et al., Ann. Rev. Mater. Sci. (1984) 14, 297; Pouskouleli, Ceramics Intern. (1989) 15, 213; Paine et al., Chem. Rev. (1990) 90, 73; Fazen et al. Chem. Mat. (1990) 2, 96; Rees et al., J. Am. Ceram. Soc. (1988) 71, C194; and U.S. Pat. No. 4,871,826.

Certain disclosures also exist in the art for ultimately making ceramic materials utilizing a metal powder and a polymer containing a metal as at least some of the starting materials.

Japanese Patent Publication No. 54/3114 discusses the calcining of a borosiloxane polymer in a non-oxidizing atmosphere followed by its pulverization. The resulting calcined ceramic powder, rather than the starting borosiloxane polymer, is then mixed with certain transition metal elements or alloys, molded and fired in a non-oxidizing atmosphere.

U.S. Pat. No. 4,666,872 to R. H. Baney et al. teaches the use of "certain" metallic "compounds", including metallic ruthenium, palladium, silver, iridium, and platinum (which normally are considered to have a substantial degree of inertness to the formation of refractory ceramic compounds) in amounts far lower than stoichiometric (e.g., at 0.1 to 2.0 wt %) to increase the ceramic yield of a silazane polymer above the normal ceramic yield range of from about 53% to about 58% which would be realized if no metallic compound were used. This patent indicates that the metallic compound "may be added at higher levels" (Col. 4, line 62) but that "no added benefits may result" therefrom (Col. 4, line 63). Its Examples 1–7, limited to the use of compounds of the recited metals, rather than the elemental metal itself, show modest increases of ceramic yield of from about 2% to about 23%, up to a maximum of 67.5%, based on the amount of compound employed. In Example 8, which was presented for comparison purposes this patent shows that the metals of chromium, nickel, tin and zinc were ineffective in increasing the ceramic yield when utilized at the 1.0 weight percent level.

Japanese Patent Publication No. 53/52,521 describes cermet manufacture using a powder comprising one or more ceramics (e.g., oxides, carbides, nitrides, borides or silicides), a metal powder, and a semi-inorganic polymer having silicon, boron, and oxygen as the main skeleton components. This reference generally indicates that the amount of polymer used is generally in the range of from 1% to about 30% by weight of the combined amount of ceramic and metal powder. It exemplifies use of no more than 15% in one instance. It warns that use of more than 30% polymer would yield an amount of boride, carbide, oxide or their compounds, from the polymer and metal phase, which would be too high and which would cause a decrease in the strength of the product.

Japanese Patent Publication No. 57/77,083 generally advocates the impregnation or coating of a "molded" or "sintered" material with either an organic silicon polymer or a mixture of such polymer with one or more of the following: a non-oxide ceramic powder, a metal powder, or a composite powder of non-oxide ceramics and metal. In Example 4 of this reference an organic silicon polymer is dissolved in tetrahydrofuran and mixed with silicon powder, the same metal as in the polymer, and a viscous solution is formed. This viscous solution is then either used to coat a cast metal (i.e., steel) body which is heat treated (Example 5) or it is used to coat a composite sintered body formed by hot pressing a mixture of a titanium carbide powder with whiskers of metallic molybdenum (Example 6). Although this reference generally indicates that excess carbon in the polymer combines chemically with any added metal, the entire thrust of the disclosure is to heat treat a formed body after it has been coated with the polymer/metal powder composition rather than heat treatment of a composition containing the polymer and particulate metal as the main constituent reagents.

SUMMARY OF THE INVENTION

The instant invention relies upon the pyrolysis of a particulate metal, which ultimately forms a chemically combined component in the intended ceramic, with a polymer containing another metal, which also forms a ceramic component. The polymer containing the metal and the particulate metal are the main reagents responsible for formation of the ceramic phase or phases. The metal is not used as a mere catalyst for the pyrolysis of a preceramic polymer alone. The term "metal" is used herein in the sense of covering metal elements as well as the hydrides of the metals which behave like the metal element in regard to the present invention. The term "metal" is also to be understood to include those recognized main group and transition metals which form ceramics with such elements as carbon, nitrogen, boron or silicon. The term "metal" is also to be understood to encompass metalloids such as boron, silicon and germanium. The present invention, for example, allows for the production of ceramic products containing such components as the silicides, nitrides and/or borides under certain circumstances. Cermet manufacture is also possible if excess metal reagent is used and/or a less reactive metal is employed.

DETAILED DESCRIPTION OF THE INVENTION

The instant invention can be used with a variety of inorganic or organometallic polymers containing a metal such as those containing silicon or boron. Preferably, the polymer selected is a polymer which does not contain oxygen. Preceramic polymers whose pyrolysis alone gives a ceramic may be employed.

Some representative organosilicon polymers which can be used as the polymeric preceramic precursor herein include:

(1) Methylpolysilane-derived polymers of the general formula $[(CH_3SiH)_x(CH_3Si)_y]_n$, where $x+y=1$ and, preferably, modified versions of these polymers containing such transition metal moleties as titanium, zirconium, and hafnium may be utilized.

The sodium condensation of $CH_3SiHCl_2$ gives the aforementioned type of methylpolysilane-derived polymer (see D. Seyferth in "Silicon-Based Polymer Science. A Comprehensive Resource" (Advan. Chem. Series 224), Amer. Chem. Soc. (1990) pp. 582–589 and U.S. Pat. No. 4,537,942). If the reaction is carried out in solvent (e.g., 6:1 v/v hexane/tetrahydrofuran) the polysilane that results is a liquid ($x=$about 0.65 to 0.85) whose pyrolysis alone in an argon stream to 1000° C. gives a ceramic yield of about only 15–20%. If the reaction is carried out in tetrahydrofuran alone, a more crosslinked species ($x=$about 0.4) results. Its pyrolysis alone under the same conditions gives a ceramic residue yield of about 60%. In both cases, the ceramic comprises about $1SiC+0.5$ Si. Annealing at temperatures above 1000° C. yields $\beta$-SiC and elemental Si.

It is possible to introduce certain transition metals (e.g., from Group IVB) such as titanium, zirconium, or hafnium into the aforementioned polymers by means of photolysis of mixtures of the polymers with the chosen dicyclopentadienyl metal dialkyl (e.g., dimethyl). This can be carried out by using an appropriate hydrocarbon solvent (e.g., hexane) under an appropriate inert atmosphere (argon). Photolysis for about one hour was found appropriate for the titanium and zirconium dicyclopentadienyl dimethyl species and twelve hours for the hafnium species. Pyrolysis of these metal-containing polymers at 1500° C. under argon, for example, gave ceramics (e.g., SiC and the respective metal carbide) which contained an excess (e.g., about 16% to 41%) of free carbon which is not desirable.

In order to remove the free carbon from the previously described metal-containing polysilanes a particulate metal, which usually, but not necessarily, was the same one as in the polymer was admixed therewith. One way of accomplishing this is to combine the polymer and particulate metal in a solvent (e.g., hexane) and to ultrasonically treat them (e.g., for thirty minutes) to form a suspension. The solvent then can be removed to form a "green" composite which can be pyrolyzed yielding metal carbide-silicon carbide blends. Appropriate selection of the stoichiometry for the three reactants (polysilane, dimethylmetallocene, and metal powder) allow one to achieve differing results. Use of the same metal in both the metal-containing polymer and metal powder yields a binary phase system containing metal carbide and silicon carbide. If a different metal powder is used, as compared to the metal added to the polysilane, a ternary system of the respective metal carbides and silicon carbide is obtained. If excess metal powder is used, a "cermet" comprising metal carbide, silicon carbide, and metal can be formed.

In general terms, the source for silicon and carbon in the final ceramic composition is the respective silicon and carbon contents of the polymer. The metal (e.g., titanium) content of the final ceramic is derived from the sum of the metal content of the polysilane plus added metal powder. The amount of metal to be added is determined by analyzing the pyrolysis residue of a sample of the metal polysilane/$Cp_2M(CH_3)_2$ reaction product for free carbon. Enough metal powder is then added to combine with this amount of carbon in succeeding experiments. The Examples set forth below give the results of representative experiments for titanium-, zirconium-, and hafnium-containing polysilanes.

Metal-free carbon-rich polysilanes can also be used with metal powders, such as zirconium or hafnium. The carbon-rich polysilane can be synthesized by reaction of polysilane with phenyllithium in diethyl ether followed by quenching of the reaction (e.g., with trimethylchlorosilane). Pyrolysis of such a phenyl-modified polysilane will give a ceramic yield of only about 23%. Combining this polymer and appropriate metal powders and ultrasonically treating them as earlier described yields a "green" composite which can be pyrolyzed (1500° C. under argon) to yield metal carbide-silicon carbide ceramics with the metal carbide coming from reaction of the metal powder with excess carbon. Ceramic yields of about 60%–90% can be achieved.

(2) Polysilazane ceramic precursors can also be used. Such materials can be prepared from $CH_3SiHCl_2$ by reaction with ammonia to give a mixture of mostly cyclic oligomers of the type $[CH_3(H) SiNH]_n$, where n is an integer of at least about 3, which are polymerized (e.g., by treatment with potassium hydride catalyst in tetrahydrofuran). The polymer that results contains reactive potassium amide groups which can be removed by reaction with a chlorosilane to give a polymer of the composition $[(CH_3(H) SiNH)_a(CH_3SiN)_b]$, where $a+b=1$, and "a" is about 0.4. U.S. Pat. No. 4,482,669, which is incorporated herein by reference, gives further details regarding this polymer which, when pyrolyzed in a stream of ammonia, forms a white residue of silicon nitride.

Mixtures of metal powders with this type of polysilazane material can be prepared, for example, by ultrasonification in toluene followed by solvent evaporation, drying in vacuo and grinding to break up large chunks of material.

Pyrolysis in inert atmosphere (e.g., argon) results in the formation of silicon carbide and metal nitrides when the metal powder used is of a metal which forms stable nitrides (e.g., titanium, zirconium, and aluminum). Other metals, which do not form stable nitrides, yield metal silicides and metal carbides. In addition to the metal silicide and metal carbide phase in that latter case, silicon carbide, but not silicon nitride was detected. In general, the formation of the silicide phases relative to the carbide phases can be favored by performing the initial stages of the pyrolysis in a stream of ammonia. Formation of metal nitrides did not result if the pyrolysis was carried out in a stream of ammonia with such Group VIB metals as chromium, molybdenum or tungsten.

(3) Polycarbosilanes form another class of silicon-containing polymer which can be used herein. This type of material, for example, can be prepared by the thermal or catalyzed thermal conversion of poly(dimethylsilylene) to a complex low polymer containing $CH_3Si(H)CH_2$ and $(CH_3)_2SiCH_2$ moleties as well as other units as described in S. Yajima, Am. Ceram. Soc. Bull., 62 (1983) 893. Such a material is soluble in organic solvents and can be melt spun into fibers. Pyrolysis of this polymer in argon gives a typical ceramic yield of 55–60% comprising silicon carbide and excess free carbon.

Mixtures of this polycarbosilane (commercially available as NICALON PCS from Nippon Carbon Co.) and selected metal powders can be prepared by ultrasonification of the reagents in toluene. Removal of the solvent, drying, grinding of the composite (if necessary), and pyrolysis are then undertaken. Pyrolysis in inert gas (e.g., argon) will generally yield the transition metal carbide and silicon carbide. Pyrolysis first in ammonia and then inert gas, like the polysilazane work, gives mostly silicides and nitrides.

(4) Polysilsesquioxane of the general formula $(RSiO_{1.5})_x$, e.g., $(CH_3SiO_{1.5})_x$, can also be used as a silicon-containing polymer.

Reaction of the metal/polymer composites described above, except in the case of the polysiloxane, under argon gave metal carbide/metal silicide/silicon carbide mixtures and, in some cases, metal nitrides. Mixtures pyrolyzed under ammonia initially and then argon showed decreased or no carbon and decreased X-ray diffraction spectra in regard to carbide phases as contrasted to silicide. Polymer-rich mixtures of the polycarbosilane, when pyrolyzed under ammonia and then argon, provided a high yield route to tungsten silicide.

Titanium reacted (under argon) with the polysilazane, which contains silicon, nitrogen and carbon, resulted in the preferential reaction of carbon with silicon yielding a ceramic of titanium nitride and silicon carbide. Molybdenum and tungsten react differently with molybdenum silicides being formed and no carbides. Tungsten gave the corresponding silicide phases, silicon carbide and tungsten carbide. Use of ammonia in an initial pyrolysis yielded the silicides for both molybdenum and tungsten.

The polycarbosilane reacted with molybdenum yielded a molybdenum silicide and molybdenum carbide. With ammonia pretreatment, a substantial carbon removal was seen with molybdenum silicides being formed. Tungsten reacted with the polycarbosilane yielding tungsten carbide and tungsten silicide.

The polycarbosilane or polysilazane can be used for the preparation of metal silicide ceramics using a two stage ammonia/argon pyrolysis. With the polycarbosilane the more desired silicon-rich phases (e.g., molybdenum disilicide or tungsten disilicide can be formed).

Certain organoboron polymers can also be used in accordance with the present invention.

(1) Decaborane-diamine polymers of the type described by W. Rees et al., in J. Am. Ceram. Soc. 1988, 71, C94 and in U.S. Pat. No. 4,871,826 can be used. In typical experimental runs, this polymer and a desired metal powder can be added to a reaction vessel which is preferably evacuated and filled with inert gas (e.g., argon). The polymer can be dissolved in an appropriate solvent (e.g., dimethylformamide) and the suspension can be placed in an ultrasonic bath (e.g., for about one half hour). Solvent can be then removed and the metal powder coated with polymer can be collected in a dry box, with the solid being lightly ground, if necessary, with mortar and pestle and placed in a vial. Two pyrolysis schemes have been studied: (1) under inert gas; and (2) under an ammonia atmosphere.

In general, the method of forming ceramic phases by the foregoing method work best for Group IVB, VB, and VIB metal powders. Argon pyrolysis of Group IVB and VB metals produces metal boride products and small amounts of metal carbides. Group VIB metals (especially molybdenum and tungsten) produce principally metal borides under either argon or ammonia pyrolysis. The late transition metals, under the particular reaction conditions employed, were less effective.

(2) A diborane (4) polymer produced by reaction of $(Me_2N)_2BB(NMe_2)$ with ethylenediamine can also be used as an organoboron polymer for purposes of the instant invention. Lower yield ceramic foams, as compared to use of the decaborane-diamine polymer, resulted from use of this polymer system.

(3) Silylaminoborane polymers produced by the potassium condensation of $(Me_3Si)_2NBCl_2$ are another class of organoboron polymer. The results obtained using this polymer are analogous to those obtained for the diborane (4) polymer system.

(4) Borazine polymers formed by heating $(H_3CHNBNCH_3)_3$, as more fully described in Lappert et al., J. Chem. Soc. (1959) 297, can also be used as one of the organoboron polymers for this invention.

In general, the method for preparing metal boride-containing ceramics by pyrolysis of an organoboron-containing polymer in the presence of particulate metal is most successful for metals from Groups IVB, VB, and VIB and for lanthanum using argon pyrolysis. Mixtures of metal borides and metal nitrides can be obtained using ammonia pyrolysis. The method of the present invention is generally less successful with late transition metals. Control of which phase is produced upon pyrolysis appeared to be largely governed by the pyrolysis conditions rather than the initial metal to boron ratio.

The instant invention is further illustrated by the Examples which follow:

EXAMPLE 1

This illustrates formation of a titanium-containing polysilane which is used as a reagent in Example 2. A methylpolysilane-derived polymer of the type $[(CH_3SiH)_x(CH_3Si)_y]_n$, with $x=0.65$ and $y=0.35$ (0.65 gm), (9.6 mmol of SiH), $Cp_2Ti(CH_3)_2$, "Cp" standing for cyclopentadienyl, (2.10 gm, 10.1 mmol), and hexane (40 ml) were combined in a 300 ml quartz round-bottomed flask in a dry box. The solution was stirred with a magnetic stir-bar under nitrogen while being treated with a Hanovia medium pressure mercury lamp (140 watts, $\lambda > 300$ nm) which was positioned approximately 5 cm from the reaction flask. The orange solution turned black within five minutes. The irradiation was continued for a total of one hour. The reaction mixture was warmed to reflux temperature by the heat from the UV lamp. At this point the reaction mixture was allowed to cool to room temperature before the solvent was removed from the black solution by trap-to-trap distillation. The resulting black solid was dried in vacuo overnight (2.43 gm, 99% yield based on $Cp_2Ti$ and polysilane).

EXAMPLES 2

The titanium-containing polysilane from Example 1 (0.52 gm) was combined with titanium powder (99% pure, 1.17 gm, 24.4 mmol) in a 100 ml Schlenk flask equipped with a magnetic stir-bar and a reflux condenser capped with a rubber septum in a dry box. To this mixture was added tetrahydrofuran (25 ml) by syringe. The solution was stirred until the polysilane had dissolved. This reaction vessel was then immersed in a water-filled ultrasonic cleaning bath (Branson B-220, 50/60 Hz) and subjected to ultrasound for thirty minutes. The solvent was removed by trap-to-trap distillation, and the resulting fine black powder was dried in vacuo for forty-eight hours (1.69 gm, quantitative yield).

A large scale tube furnace pyrolysis under argon, in a carbon boat, employing a temperature program of 25° C. to 1000° C. at 10° C./min hold for two hours, then 1000° C. to 1500° C. at 5° C./min hold for five hours, was conducted of 601 mg of the previously produced fine black powder. This yielded 576 mg (96%) of a grey ceramic comprising 65.8% TiC, 7.9% SiC, and 26.3% Ti, by weight.

EXAMPLE 3

A zirconium-containing polysilane was formed in this Example for use in Example 4.

The same procedure used in Example 1 was employed using 0.87 gm (13 mmol of SiH) of the polysilane (x=0.65 and y=0.35) with 1.6 gm (6.4 mmol) of $Cp_2Zr(CH_3)_2$ and 20 ml of hexane. The clear solution of the reagents turned yellow after twenty minutes. After evaporation of the solvent, a brown solid remained which was dried in vacuo overnight (2.41 gm, 98% yield based on weight of $Cp_2Zr(CH_3)_2$ and polysilane).

EXAMPLE 4

Using the sample procedure as described in Example 2, 0.5 gm of the zirconium-containing polysilane from Example 3, 0.56 gm (6.2 mmol) of zirconium powder (98.9% pure), and 20 ml of hexane were used. Pyrolysis of 438 mg of the resulting brown powder produced 373 mg of product (85% of a dark grey ceramic comprising 84.5% ZrC and 15.5% SiC on a weight basis).

EXAMPLE 5

This illustrates preparation of a hafnium-containing polysilane for use in Example 6.

The same general procedure used in Example 1 was employed using 0.15 gm (2.1 mmol of SiH) of the polysilane (x=0.63 and y=0.37) with 1.02 gm (3.0 mmol) of $CpHf(CH_3)_2$ and 20 ml of hexane. The clear solution, of the reagents, turned yellow after fifteen minutes. The solvent was removed from the yellow solution by trap-to-trap distillation yielding a yellow solid which was dried in vacuo overnight (1.21 gm, quantitative yield).

EXAMPLE 6

This illustrates preparation of a ceramic composite using the hafnium-containing polysilane of Example 5.

Using the same procedure as Example 2, 0.79 gm of the material from Example 5, 1.21 gm (6.8 mmol) hafnium powder (97% pure), and 40 ml of tetrahydrofuran were used. Pyrolysis under argon to 1500° C. of 657 mg of the grey powder product yielded 518 mg (79%) of a grey-black ceramic comprising 88.0% HfC and 12.0% silicon carbide.

EXAMPLE 7

This illustrates preparation of polydimethylsilaacetylide which was used as a silicon-containing polymer in Example 8. The procedure used was reported in Ijadi-Maghsoodi, S. et al., J. Polym. Sci., Part A: Polym. Chem. 1990, 28: 955.

First, n-butyllithium (81.1 ml, 2.2M in hexane, 180 mmol) in a 250 ml three-necked, round-bottomed flask equipped with a magnetic stir-bar, two addition funnels and a rubber septum, was concentrated to about ⅔ of its original volume by trap-to-trap distillation. The solution was cooled to −60° C. and 30 ml of a 1:1 mixture of tetrahydrofuran and diethyl ether was added. To this solution 7.88 gm (60.0 mmol) of trichloroethylene in 15 ml of diethyl ether was added dropwise from one of the addition funnels at −60° C. After the complete addition of the trichloroethylene, the mixture was stirred for two hours at room temperature, then recooled to −60° C. Dimethyldichlorosilane (7.74 gm, 60.0 mmol) was added dropwise from the other addition funnel. After stirring the mixture overnight at room temperature, aqueous workup (2N HCl) and removal of the solvents, a yellow-white wax remained. The wax was redissolved in 30 ml tetrahydrofuran, and the solution was added to 150 ml methanol. A colorless precipitate formed. The mixture was kept at −20° C. overnight and was then filtered. The solid was dried in vacuo overnight. The yield was 4.21 gm (85%) of a white powder.

EXAMPLE 8

The same procedure used in Example 2 was employed with 0.50 gm (6.1 mmol) of the polymer from Example 7, 1.01 gm (11.0 mmol) of zirconium powder (98.9% pure), and 25 ml of hexane. Pyrolysis of 479 mg of powdery product to 1500° C. under argon yielded 430 mg (90% yield) of a grey-black ceramic comprising 86.3% $ZrC_{0.61}$ and 13.7% silicon carbide.

In addition to the foregoing preparation, a series of several other analogous preparations were made:

| Polymer (mmol) | Metal (mmol) | Yield (%)/Constituents (%) |
|---|---|---|
| 6.1 | Ti (11.0) | 75%/79.7% TiC + 16.0% SiC + 4.3% Ti |
| 6.1 | Hf (11.0) | 90%/92.7% HfC + 6.8% SiC + 0.5% C |

EXAMPLE 9

When the titanium-containing polysilane of Example 1 was substituted for the polydimethylsilaacetylide made in Example 7, but the same procedure utilized in Example 8 was employed, a differing ceramic product was obtained. Thus, 1.00 gm of the polysilane of Example 1 was mixed with 1.145 gm (12.55 mmol) of zirconium powder (98.9% pure), and 25 ml of hexane and the pyrolysis procedure of Example 2 was followed yielding 849 mg (85%) of a dark grey ceramic powder comprising 71.9% ZrC, 28.6% SiC, 5.0% TiC, and 4.6% C.

EXAMPLES 10–12

Cermet monoliths were prepared in these Examples by suitably processing metal polysilanes and metal powders.

In one embodiment 0.86 gm of the titanium-containing polysilane of Example 1 and 2.13 gm (44.5 mmol) of titanium powder (99% pure) were ground together in a toughened alumina mortar and pestle in a dry box. This powder was placed in a die and enclosed in a plastic bag. The die was pressed at 5000 psi in a Carver uniaxial press for twenty minutes. Next, the bar was removed from the die in a dry box and placed in a rubber sleeve. The rubber sleeve containing the bar was evacuated and then isostatically pressed at 40,000 psi for two minutes. The weight and dimensions of the green bar were recorded. The black-colored unfired bar was pyrolyzed to 1200° C. in a stream of argon, employing a temperature program comprising 25° C. to 1200° C. followed by holding for two hours. The resulting ceramic monolith was grey in color and was obtained in a 97% ceramic yield. There was a small amount of deformation in the ceramic product.

Two other runs were made with a zirconium-containing polymer and a hafnium-containing polymer analogous to those produced in Examples 3 and 5, respectively, with the following results:

| Polymer Type and Amount | Metal Powder and Amount | Yield % |
|---|---|---|
| PS(Zr):0.91 gm | Zr:2.12 gm | 95%* |
| PS(Hf):1.8 gm | Hf:4.20 gm | 96%** |

*no visible deformation noted.
**the cermet bar billowed during pyrolysis.

EXAMPLES 13-29

These Examples illustrate the formation of various ceramic products from metal-polysilazane mixture pyrolyzed to 1500° C. under a flow of argon.

The polysilazane used was of the general formula [(CH$_3$(H) SiNH)$_a$(CH$_3$SiN)$_b$] with a+b=1 and "a" being about 0.4. Its preparation is described in U.S. Pat. No. 4,482,669 to D. Seyferth et al., which is incorporated herein by reference. Mixtures of various metal powders with this polymer were prepared by ultrasonification in toluene as described in Example 2, for example. After the solvent had been removed on a rotary evaporator at a very slow speed of rotation, the product carefully dried in vacuo and ground gently to break up large chunks, the polysilazane/metal composite was pyrolyzed at 1500° C. for four hours under argon atmosphere. The following results were obtained:

| Metal | M:SI Molar Ratio | Yield % | XRD Results |
|---|---|---|---|
| Al | 1:1 | 83 | AlN + SiC + Si |
| Ti | 1.2:1 | 72 | TiN + SiC |
| Zr | 1.3:1 | 82 | ZrN + SiC |
| V | 1:1 | 54 | V$_5$Si$_3$ + SiC |
| Nb | 1:1 | 80 | NbC + NbSi$_2$ |
| Ta | 1:1 | 97 | Ta |
| Ni | 1:1 | 83 | Ni$_3$Si$_2$ + C (+ small peaks Ni$_5$Si$_2$ + Ni$_2$Si) |
| Co | 1:1 | 73 | decomposed |
| Cr | 1:2 | 67 | Cr$_{5-x}$Si$_{3+z}$C$_{x+z}$ + SiC* |
| Cr | 1:1 | 73 | Cr$_{5-x}$Si$_{3+z}$C$_{x+z}$ + SiC |
| Cr | 5:3 | 82 | Cr$_{5-x}$Si$_{3+z}$C$_{x+z}$ + SiC |
| Mo | 1:2 | 73 | MoSi$_2$ + Mo$_5$Si$_3$ |
| Mo | 1:1 | 80 | Mo$_5$Si$_3$ |
| Mo | 5:3 | 86 | Mo$_5$Si$_3$ |
| W | 1:2 | 82 | WC + WSi$_2$ + W$_5$Si$_3$ + SiC |
| W | 1:1 | 87 | WC + WSi$_2$ + W$_5$Si$_3$ + SiC |
| W | 5:3 | 93 | WC + W$_5$Si$_3$ |

*This ternary chromium phase was found on reaction of Cr* with SiC (1000°, 100 h, 7 MPa) and can also be written as Cr$_5$Si$_3$C$_x$(0.25 < x < 1.05). Carbon does not substitute for Cr or Si as formula implies but occupies unfilled sites in the lattice of Cr$_5$Si$_3$. Ref: (a) Jackson, M. R.; Mehan; Davis, A. M.; Hall, E. Met. Trans. A, 1983, 14, 355. (b) Pelligrinin, P. W.; Glessen, B. C.; Feldman, J. M. I. Electrochem. Soc., 1972, 199, 535. (c) Parthe, E.; Schachner, H.; Nowotny, H. Monatsch. Chem., 1955, 86, 182.

EXAMPLES 30-41

In these Examples, the pyrolysis conditions were changed to pyrolysis under ammonia for four hours followed by 1500° C. pyrolysis under argon for four hours. The following results were obtained:

| Metal | M:Si Molar Ratio | Yield % | XRD Results |
|---|---|---|---|
| V | 1:1 | 49 | V$_2$N + V$_5$Si$_3$ |
| Nb | 1:1 | 74 | Nb$_3$Si + ? |
| Ta | 1:1 | 95 | Ta$_3$N$_7$, Ta$_4$N or Ta$_2$N |
| Ni | 1:1 | — | melted* |
| Co | 1:1 | — | melted** |
| Cr | 1:1 | 73 | Cr$_3$Si + Cr$_3$C$_2$ |
| Mo | 1:1 | 73 | Mo$_5$Si$_3$ |
| W | 1:2 | 76 | W$_5$Si$_3$ + WSi$_2$ |
| W | 1:1 | 82 | W$_5$Si$_3$ |
| W | 5:3 | 89 | W$_5$Si$_3$ |
| Mn | 1:1 | 58 | melted |
| Fe | 1:1 | 68 | melted |

*repeated pyrolysis to 1000° C. (92% ceramic yield); showed only Ni metal in XRD.
**repeated pyrolysis to 1200° (85% ceramic yield); was amorphous to XRD.

EXAMPLES 42-57

These Examples report the formation of various ceramic products from the pyrolysis in argon to 1500° C. of metalpolycarbosilane mixtures.

The polycarbosilane used was NICALON PCS brand from Nippon Carbon Co. which can be prepared by the thermal or catalyzed thermal conversion of poly(dimethylsilylene) to a complex low molecular weight polymer containing CH$_3$Si(H)CH$_2$ and (CH$_3$)$_2$SiCH$_2$ units. S. yajima, Am. Ceram. Soc. Bull., 62 (1983) 893 and following describes this material in more detail. Prior to use, this polymer was pulverized to a fine powder with an alumina mortar and pestle. The mixtures of metal powders with polycarbosilane were prepared by ultrasonification of the reagents in toluene analogous to the preparation used in Examples 13-29. The following results were obtained:

| Metal | M:Si Molar Ratio | Yield % | XRD Results |
|---|---|---|---|
| Cr | 1:1 | 80[a] | Cr* + SiC |
| Mo | 1:2 | 81 | α-Mo$_2$C + Mo$_5$Si$_3$ + SiC |
| Mo | 1:1 | 84 | α-Mo$_2$C + ? |
| Mo | 5:3 | 91 | α-Mo$_2$C + Mo$_5$Si$_3$ + SiC |
| W | 1:2 | 85 | WC + WSi$_2$ + SiC |
| W | 1:1 | 89 | W$_2$C |
| W | 5:3 | 92 | WC + WSi$_2$SiC |
| Co | 1:1 | 85[b] | CoSi |
| Ni | 1:1 | 88[c] | Ni$_3$C |
| Al | 1:1 | 73 | Al$_4$C$_3$ + SiC |
| Ti | 1:1 | 80 | TiC + SiC |
| Zr | 1:1 | 87 | ZrC + SiC |
| Hf | 1:1 | 91 | HfC |
| V | 1:1 | 79 | V$_8$C$_7$ + SiC |
| Nb | 1:1 | 85 | NbC + SiC |
| Ta | 1:1 | 83 | TaC + SiC |

Maximum temp:
[a]1450° C.
[b]1175° C.
[c]800° C.

EXAMPLES 58-72

These Examples are analogous to those in Examples 42-57 with the exception that the pyrolysis was conducted at 800° C. in a stream of ammonia for four hours followed by heating to 1500° C. under argon with a four hour heating at that temperature. The following results were obtained:

| Metal | M:Si Molar Ratio | Yield % | XRD Results |
|---|---|---|---|
| Cr | 1:1 | 80[a] | Cr$_3$Si + SiC |
| Mo | 1:2 | 69 | Mo$_5$Si$_3$ + MoSi$_2$ + SiC |
| Mo | 1:1 | 73 | Mo$_3$Si + Mo$_5$Si$_3$ |
| Mo | 5:3 | 86 | Mo$_5$Si$_3$ |
| W | 1:2 | 70 | W$_5$Si$_3$ + WSi$_2$ |
| W | 1:1 | 86 | W$_5$Si$_3$ + α-WN |
| W | 5:3 | 85 | W$_5$Si$_3$ + W |
| Mn | 1:1 | 91[b] | α-MnN + Si + ? |
| Ni | 1:1 | 92[c] | Ni$_3$Si$_{12}$ + Ni |
| Al | 1:1 | 67 | AlN + SiC |
| Ti | 1:1 | 86 | TiN + SiC |
| Zr | 1:1 | 90 | ZrN |
| Hf | 1:1 | 91 | HfN |

| Metal | M:Si Molar Ratio | Yield % | XRD Results |
|---|---|---|---|
| Nb | 1:1 | 47 | $Nb_{4.62}N_{2.14}$ |
| Ta | 1:1 | 94 | $Ta_6N_{2.57}$ |

Maximum pyrolysis temp:
[a]1450° C.
[b]1000° C.
[c]1075° C.

EXAMPLES 73–84

These Examples illustrate use of polysilsesquioxane having the repeat unit $(CH_3SiO_{1.5})$ as the metal-containing polymer under either pyrolysis to 1500° C. in a stream of argon or ammonia/argon pyrolysis as earlier reported.

The argon pyrolysis results were:

| Metal | M:Si Molar Ratio | Yield % | XRD Results |
|---|---|---|---|
| Hf | 1:1 | 89 | HfC + ? |
| V | 1:1 | 47 | $V_5Si_3$ + ? |
| Nb | 1:1 | 77 | NbC + ? |
| Ta | 1:1 | — | $Ta_2C$ + TaC + ? |
| Mn | 1:1 | 83 | $Mn_5Si_3$ + SiC + $SiO_2$ |
| Fe | 1:1 | 82 | amorphous |
| Co | 1:1 | 79 | amorphous |
| Ni | 1:1 | 78 | $Ni_3Si_2$ + $Ni_2Si$ + Ni |

The ammonia/argon pyrolysis results were:

| Metal | M:Si Molar Ratio | Yield % | XRD Results |
|---|---|---|---|
| Hf | 1:1 | 83 | $HfSi_2$ + SiC + ? |
| V | 1:1 | 85 | VN + $V_5N$ |
| Nb | 1:1 | 88 | NbN + $Nb_2N$ |
| Ta | 1:1 | 95 | $Ta_2N$ |

EXAMPLES 85–90

The phases identified by x-ray powder diffraction of various molybdenum-polymer mixtures, where the nature of polymer was varied among various types of silicon-containing polymer, are shown in the Table below. Pyrolysis condition (1) was under argon at 1500° C., whereas pyrolysis condition (2) was ammonia pyrolysis at 800° C. followed by heating in argon to 1500° C.

| Polymer | M:Si Molar Ratio | Pyrolysis Conditions (1) | (2) |
|---|---|---|---|
| Polysilazane | 1:2 | $MoSi_2$ + $Mo_5Si_3$ | — |
| Polysilazane | 1:1 | $Mo_5Si_3$ | $Mo_5Si_3$ |
| Polysilazane | 5:3 | $Mo_5Si_3$ | — |
| Polycarbosilane | 1:2 | $Mo_2C$ + $Mo_5Si_3$ | $Mo_5Si_3$ + $MoSi_2$ |
| Polycarbosilane | 5:3 | $Mo_2C$ + $Mo_5Si_3$ | $Mo_5Si_3$ |
| Polysilane | 1:1 | $Mo_5Si_3$ | $Mo_3Si$ |

EXAMPLES 91–96

These results are analogous to those for Examples 85–90 for various tungsten-polymer mixtures

| Polymer | M:Si (Molar Ratio) | Pyrolysis Conditions (1) | (2) |
|---|---|---|---|
| Polysilazane | 1:2 | $WSi_2$ + $W_5Si_3$ + WC + SiC | $W_5Si_3$ |
| Polysilazane | 1:1 | $WSi_2$ + $W_5Si_3$ + WC + SiC | $W_5Si_3$ |
| Polysilazane | 5:3 | $W_5Si_3$ + SiC | $W_5Si_3$ + W |
| Polycarbosilane | 1:2 | $WSi_2$ + WC | $WSi_2$ + $W_5Si_3$ |
| Polycarbosilane | 5:3 | $WSi_2$ + WC | $W_5Si_3$ + W |
| Polysilane | 1:1 | $WSi_2$ + $W_5Si_3$ + WC | W |

EXAMPLES 97–103

These Examples illustrate the formation of ceramic products from mixtures of Group IV metals and decaboranediamine polymers pyrolyzed at 1500° C. under argon.

The decaborane-diamine polymers are described in U.S. Pat. No. 4,871,826 to W. Rees et al. and comprised either $[B_{10}H_{12} \cdot Me_2NCH_2CH_2NMe_2]_x$ (TMEDA) or $[B_{10}H_{12} \cdot N(CH_2CH_2)_3N]_x$ (DABCO).

The general procedure involved combining the metal (or metal hydride) and polymer in a flask in a dry box followed by evacuation of the flask and filling it with argon. The polymer was dissolved by cannula addition of 30 ml of degassed dimethylformamide creating a suspension of the metal or hydride which was ultrasonicated for thirty minutes. The solvent was then removed.

The following results were obtained:

| Metal | Diamine | M:B (Molar Ratio) | Yield (%) | XRD Results |
|---|---|---|---|---|
| $TiH_2$ | TMEDA | 1:2 | 65.2 | $TiB_2$ |
| Ti | TMEDA | 1:2 | 72.4 | $TiB_2$ |
| Ti | DABCO | 1:2 | 69.6 | $TiB_2$ |
| Ti* | DABCO | 1:2 | 66.1 | $TiB_2$ |
| Zr | DABCO | 1:2 | 92.9 | $ZrB_2$ |
| Hf | DABCO | 1:2 | 95.6 | $HfB_2$ |
| Hf | DABCO | 1:2 | 91.8 | $HfB_2$ |

*1500° C. sample pyrolyzed to 1700° C. for three hours.

EXAMPLES 104–108

In analogous manner to Examples 97–103, pyrolysis at 800° C., under ammonia and then 1500° C. under argon gave the following results:

| Metal | Diamine | M:B (Molar Ratio) | Yield (%) | XRD Results |
|---|---|---|---|---|
| $TiH_2$ | TMEDA | 1:2 | 74.6 | $TiB_2$, TiN |
| Ti | TMEDA | 1:2 | 76.0 | $TiB_2$, Tin |
| Zr | DABCO | 1:2 | 104.2 | $ZrB_2$, ZrN |
| Hf | DABCO | 1:2 | 105.6 | $HfB_2$ |
| Hf | DABCO | 1 2 | 105.6 | HfN |

EXAMPLES 109–116

Analogous to Examples 97–103, the following results were obtained with various Group V metals:

| Metal | Diamine | M:B (Molar Ratio) | Yield (%) | XRD Results |
|---|---|---|---|---|
| V | DABCO | 1:2 | 60.6 | VB |
| Nb | DABCO | 1:2 | ND | $NbB_2$, TbC |

-continued

| Metal | Diamine | M:B (Molar Ratio) | Yield (%) | XRD Results |
|---|---|---|---|---|
| Nb | DABCO | 1:2 | 94.2 | Not Assignable |
| Nb | DABCO | 1:2 | 74.3 | NbB, NbC |
| Nb | DABCO | 2:1 | 96.7 | NbB, NbN |
| Ta | DABCO | 1:1 | 95.1 | TaB, TaC |
| Ta | DABCO | 1:2 | 90.1 | TaB, TaC |
| Ta | DABCO | 2:1 | 95.1 | TaB. $Ta_6N_{2.57}$ |

EXAMPLES 117-121

Analogous to Examples 104-108, Group V metals gave the following results with ammonia/argon pyrolysis:

| Metal | Diamine | M:B (Molar Ratio) | Yield (%) | XRD Results |
|---|---|---|---|---|
| V | DABCO | 1:2 | 54.4 | $V_3B_4$, $V_2B_3$, VN |
| Nb | DABCO | 1:2 | 70.3 | NbB, NbC, Nb |
| Nb | DABCO | 2:1 | 92.0 | NbN, $NbN_{0.95}$, BN |
| Ta | DABCO | 2:1 | 97.8 | $Ta_2N$, TaB, $TaC_{0.6}$ |

EXAMPLES 122-128

Group VI metals gave the following results under argon pyrolysis analogous to Examples 97-103:

| Metal | Diamine | M:B (Molar Ratio) | Yield (%) | XRD Results |
|---|---|---|---|---|
| Cr | DABCO | 1:2 | ND | CrB, $CrB_2$ |
| Cr | DABCO | 2:1 | 83.2 | Amorphous |
| Mo | DABCO | 1:1 | 97.1 | MoB, $Mo_2B$ |
| Mo | TMEDA | 1:2 | 73.0 | MoB |
| Mo | DABCO | 2:1 | 96.4 | $Mo_2B$ |
| W | DABCO | 1:1 | 88.6 | $W_2B$, WB |
| W | TMEDA | 1:2 | 84.8 | WB |

EXAMPLES 129-139

These Examples are analogous to Examples 122-128 differing in the use of an ammonia pyrolysis at 800° C. followed by an argon pyrolysis at 1500° C.

| Metal | Diamine | M:B (Molar Ratio) | Yield (%) | XRD Results |
|---|---|---|---|---|
| Cr | DABCO | 1:2 | 62.4 | CrB |
| Cr | DABCO | 2:1 | 91.8 | Amorphous |
| Mo | DABCO | 1:1 | 82.9 | MoB, $Mo_2B$ |
| Mo | TMEDA | 1:2 | 70.4 | MoB |
| Mo | DABCO | 2:1 | 98.2 | $Mo_2B$, MoB |
| W | DABCO | 1:1 | 81.3 | $W_2B$ |
| W | TMEDA | 1:2 | 83.3 | WB |

EXAMPLES 140-149

Various other metals were pyrolyzed with a decaborane polymer under argon at 1500° C. with the following results being obtained:

| Metal | Diamine | M:B (Molar Ratio) | Yield (%) | XRD Results |
|---|---|---|---|---|
| Mn | DABCO | 1:2 | 63.6 | Amorphous |
| Fe | DABCO | 1:1 | 83.3 | Amorphous |
| Co | DABCO | 1:1 | 83.0 | Amorphous |
| Ni | DABCO | 1:1 | 84.5 | $Ni_4B_3$, BN, C, Ni |
| Al | DABCO | 1:2 | 88.6 | AlN, $B_4C$, BN |
| Al | DABCO | 1:12 | 61.6 | $B_4C$, BN |
| Si | DABCO | 1:3 | 50.9 | SiC |
| S | DABCO | 1:6 | 47.2 | SiC |
| La | DABCO | 1:4 | 96.2 | $LaB_6$ |
| La | DABCO | 1:6 | 86.2 | $LaB_6$ |

EXAMPLES 150-160

These results are analogous to Examples 141-151 with the pyrolysis being under ammonia gas at 800° C. followed by argon at 1500° C.:

| Metal | Diamine | M:B (Molar Ratio) | Yield (%) | XRD Results |
|---|---|---|---|---|
| Mn | DABCO | 1:2 | 46.6 | BN |
| Fe | DABCO | 1:1 | 78.5 | Metallic balls |
| Co | DABCO | 1:1 | 74.0 | Metallic balls |
| Ni | DABCO | 1:1 | 79.9 | $Ni_3B$, BN, C |
| Ni | DABCO | 3:1 | 87.0 | Metallic balls |
| Al | DABCO | 1:2 | 82.5 | AlN, BN |
| Al | DABCO | 1:12 | 73.4 | Amorphous |
| Si | DABCO | 1:3 | 63.3 | Si |
| Si | DABCO | 1:6 | 57.9 | Si |
| La | DABCO | 1:4 | 99.2 | Amorphous |
| La | DABCO | 1:6 | 93.4 | Amorphous |

EXAMPLES 161-162

The general procedure used involved combining the metal powder identified below with a borazine polymer obtained by heating $(MeHNBNMe)_3$ as in Example 97 in tetrahydrofuran solution. The pyrolysis schedule was: to 300° C. at 5° C./min; 2 hour hold; to 1500° C. at 5° C./min; 4 hour hold; in a stream of argon:

| Metal | Molar Ratio | Yield % | XRD Results |
|---|---|---|---|
| Ti | 1:3 | 59 | TiN, $TiB_2$, BN |
| W | 1:1 | 81 | $W_2B$, WN |

We claim:

1. A process for forming a ceramic consisting essentially of the pyrolysis product of a particulate metallic material and an organometallic polymer, said process consisting essentially of
   (A) mixing a particulate metallic material and an organometallic polymer containing a metal different than that of the metallic material; and
   (B) pyrolyzing said mixture.
2. A process as claimed in claim 1 wherein the polymer is an organosilicon polymer.
3. A process as claimed in claim 1 wherein the polymer is an organoboron polymer.
4. A process as claimed in claim 1 wherein the particulate metallic material is elemental metal.
5. A process as claimed in claim 1 wherein the particulate metallic material is a metallic hydride.
6. A process as claimed in claim 1 wherein the polymer contains both silicon and boron.
7. A process as claimed in claim 1 wherein the polymer contains both silicon and one or more transition metals.
8. A process as claimed in claim 1 wherein the polymer contains both boron and one or more transition metals.

9. A process as claimed in claim 1 wherein the polymer contains silicon, boron and one or more transition metals.

10. A process for forming a ceramic consisting essentially of the pyrolysis product of a particulate metallic material and a non-oxygen containing organometallic polymer, said process consisting essentially of
   (A) mixing a particulate metallic material and a non-oxygen containing organometallic polymer containing a metal different than that of the metallic material; and
   (B) pyrolyzing said mixture.

11. A process as claimed in claim 1 wherein the polymer is an organosilicon polymer.

12. A process as claimed in claim 1 wherein the polymer is an organoboron polymer.

13. A process ad claimed in claim 1 wherein the particulate metallic material is elemental metal.

14. A process as claimed in cl aim 1 particulate metallic material is metallic hydride.

15. A process as claimed in claim 1 wherein the polymer contains both silicon and boron.

16. A process as claimed in claim 1 wherein the polymer contains both silicon and one or more transition metals.

17. A process as claimed in claim 1 wherein the polymer contains both boron and one or more transition metals.

18. A process as claimed in claim 1 wherein the polymer contains silicon, boron and one or more transition metals.

* * * * *